Figure 3:
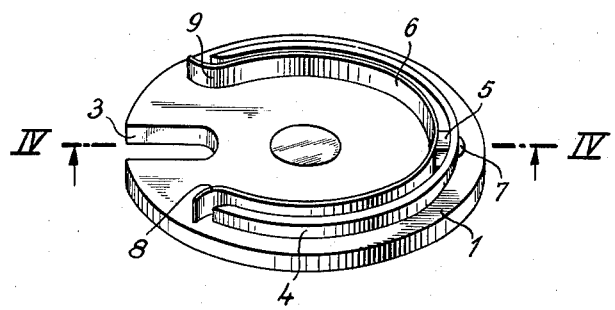

Feb. 14, 1961 R. REEBER ET AL 2,971,481
DEVICE FOR INSERTING BUTTONS IN THE
BUTTON CLAMP OF BUTTON SEWERS
Filed July 30, 1958 9 Sheets-Sheet 1
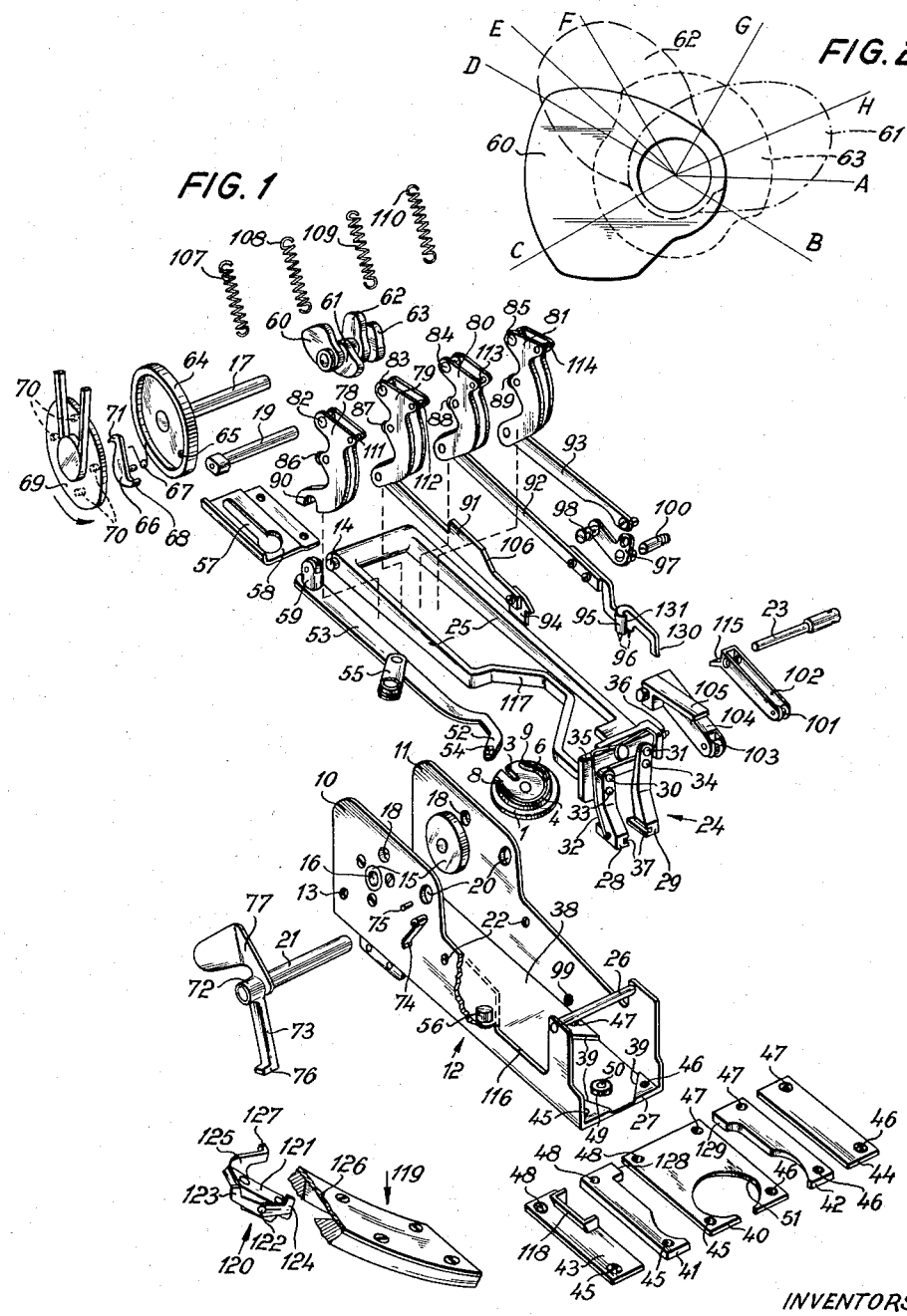
INVENTORS:
Rudolf REEBER
Günther MALL
BY Robert H. Jacob
AGENT INVENTORS:
Rudolf REEBER
Günther MALL

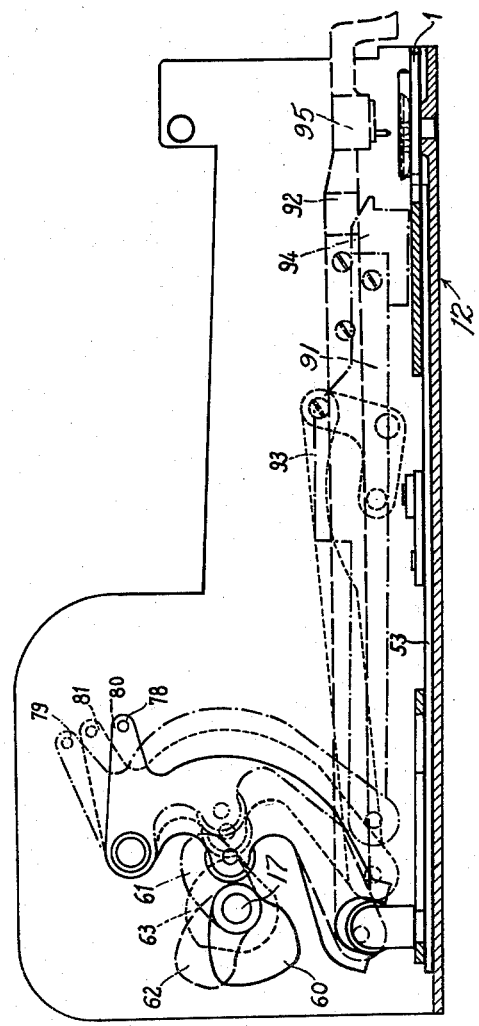

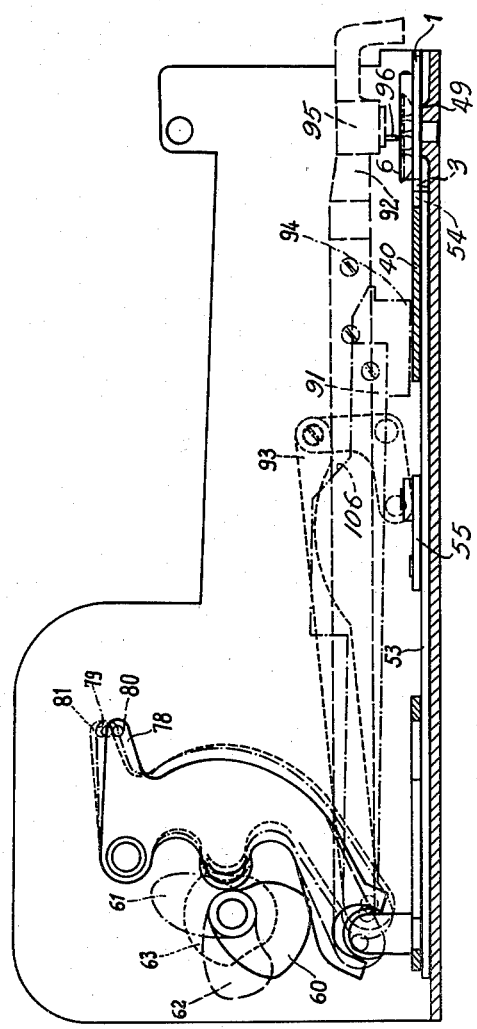

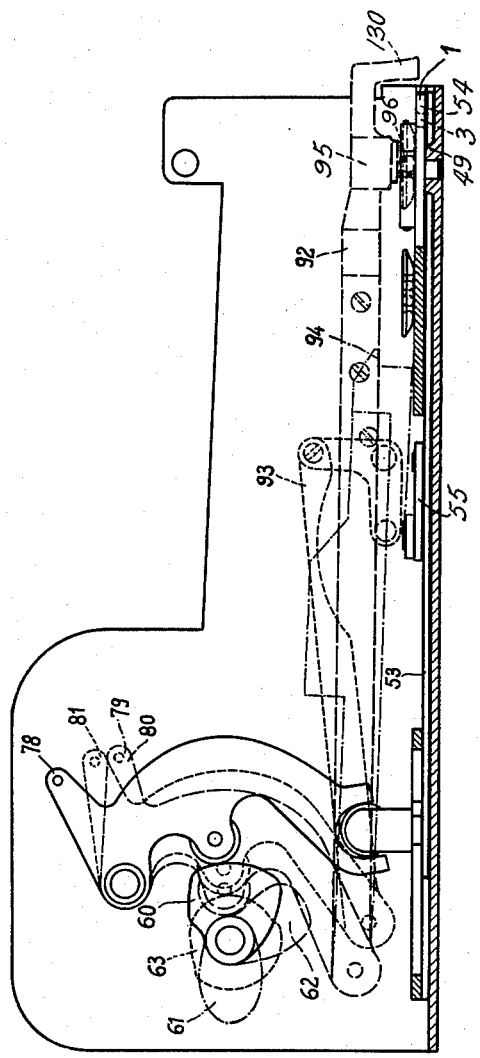

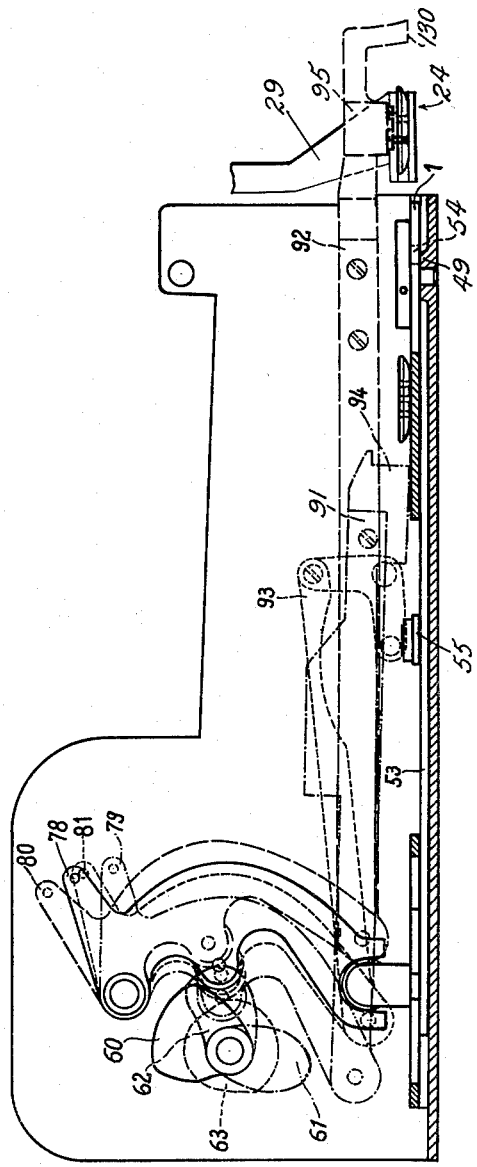

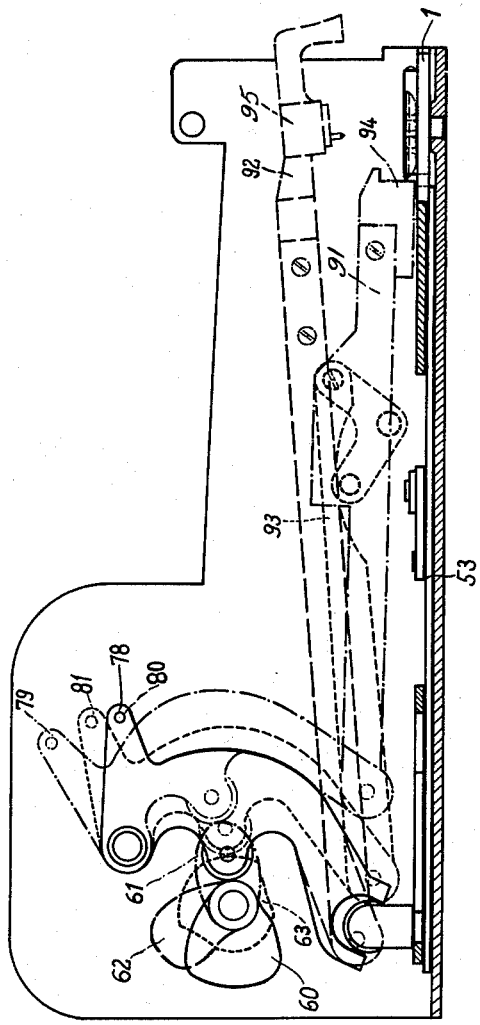

United States Patent Office 2,971,481
Patented Feb. 14, 1961

2,971,481

DEVICE FOR INSERTING BUTTONS IN THE BUTTON CLAMP OF BUTTON SEWERS

Rudolf Reeber and Günther Mall, Kaiserslautern, Pfalz, Germany, assignors to G. M. Pfaff A.-G., Kaiserslautern, Pfalz, Germany Filed July 30, 1958, Ser. No. 752,048

Claims priority, application Germany July 31, 1957

7 Claims. (Cl. 112—113)

The invention relates to a device in button sewers adapted to slide the button in the correct position into the button clamp.

It is known to rotate buttons before insertion into the button clamp as they arrive from a button container until they attain the acceptance position for a non-rotatable feeler provided with pins, whereupon said feeler engages the holes by means of its pins and slides the buttons into the clamp. In this manner the buttons are introduced into the button clamp in the sewing position determined by the stitching movement of the needle.

In one of the devices known heretofore the buttons are turned in that a pressure cushion of rubber is placed upon the button and executes a rotary movement which the button is intended to follow. In this connection it frequently happens, however, that the buttons slide with respect to the pressure cushion also if the pins have not let dropped into the holes. This is caused either by dampening of one of the contact planes of the button or pressure cushion, for example with oil or from rough button surfaces occurring with some types of buttons to which the pins can adhere.

It is an object of the invention to provide a device which reliably effects the rotation of the buttons into the required position without being limited to any predetermined button diameter.

In accordance with the invention a mounting arranged upon a rotatable disk which resiliently seizes the button at its circumference and having an opening which permits the insertion and removal of the button radially, while driving means are provided upon this rotatable disk which during one operating phase moves the same from a position in which the opening of the mounting faces a button pusher serving for the feeding of the button, into a position in which it faces the button clamp, and to return the same again into starting position, while guiding the button pusher as well as also the longitudinal and vertical movements of the feeler in synchronism. The angle of rotation executed while the feeler is in engagement is always at least equal to the angular distance between two adjacent holes in the button.

Suitably the aperture for the radial insertion and withdrawal of the buttons is formed by the ends of two laterally resilient clamp jaws secured upon the rotatable disk and expands towards the middle of the rotatable disk as well as also outwardly.

It is another object of the invention to provide a reliably operating device in the form of a leaf spring bent into the shape of an open ring and secured at its midportion to the rotatable disk and the ends of which are bent outwardly.

To avoid excessive or one sided deformation of the leaf spring it is still a further object of the invention to provide upon the rotatable disk a fixedly mounted limiting device for the movements of the spring, laterally spaced from the leaf spring.

This limitation can be in the form of an open annular wall around the leaf spring to which the center part of the leaf spring is connected with a spacing member therebetween.

The driving means for the rotatable disk suitably comprise a driving lever the mid-portion of which is linked to a lever pivotally mounted for movement about an axis parallel to the axis of the rotatable disk, which engages a radial slot in the rotatable disk by means of a pin and to the other end of which is imparted reciprocating movement in the longitudinal direction. Such an arrangement of the components of the drive means for effecting the rotation of the buttons is particularly simple and space saving.

Figure 4:
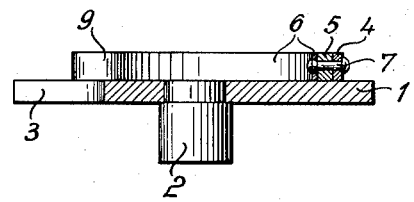
Figure 5:
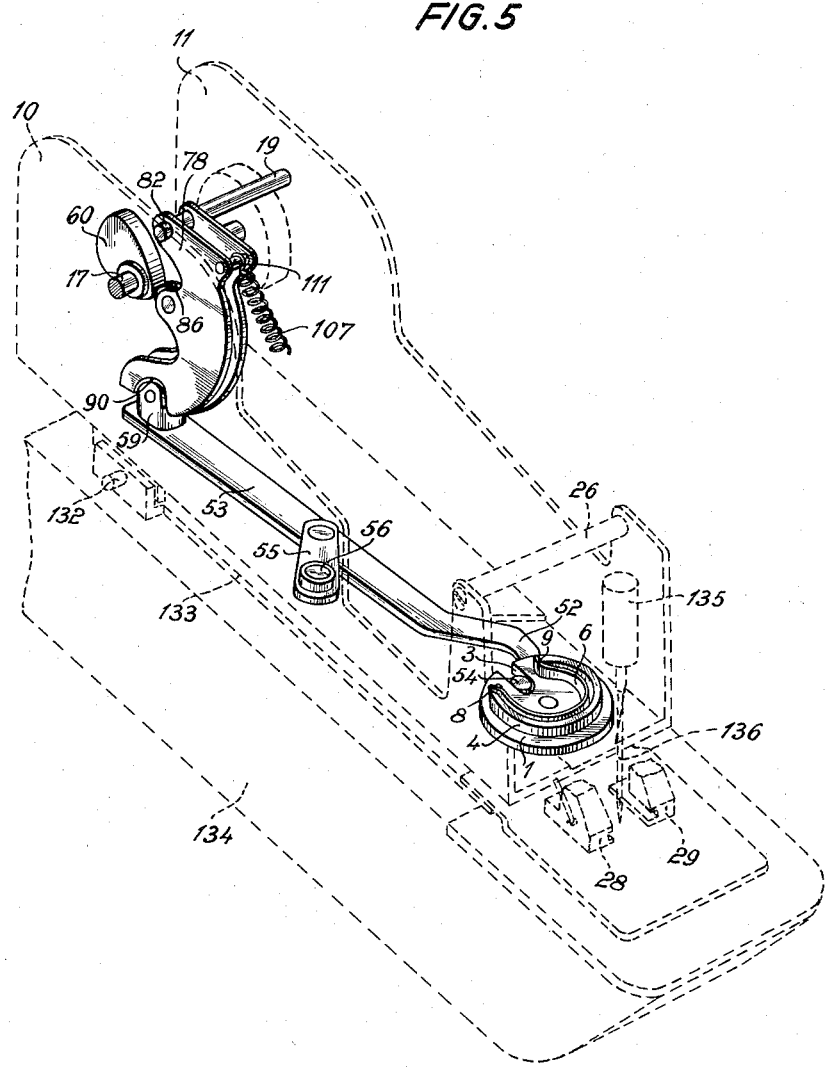
Figure 6:
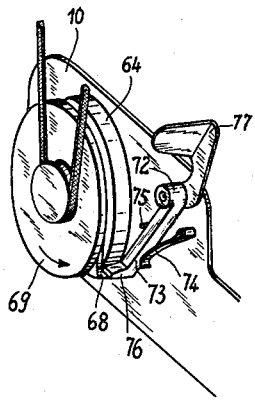
Figure 7:
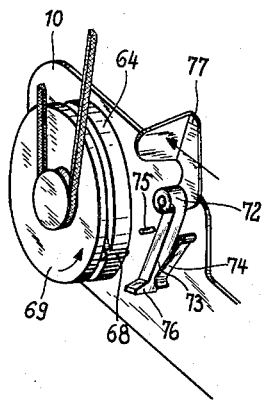

Further objects and details of the invention and advantages obtained thereby will become apparent from the following description of an embodiment illustrated in the accompanying drawings of the new button inserting device in which:

Fig. 1 is an exploded illustration of the device showing the components in a perspective view, Fig. 2 indicates the form of the cam disks of Fig. 1 schematically, Fig. 3 is a perspective illustration of the rotatable disk, Fig. 4 is a section taken along line IV—IV of Fig. 3, Fig. 5 shows, also in perspective, the drive means of the rotatable disk while outlining the housing for the components and parts of the button sewer, Figs. 6 and 7 illustrate the transmission and coupling means in assembled condition, and Figs. 8 to 12 are side views illustrating five different positions of operation of the feeler, the button pusher and the rotatable button supporting disk.

The heart of the mechanism is the rotatable disk 1. As illustrated in Fig. 4, it is provided at its lower side with a stud 2 and has a radial slot 3. On its top side it carries an annular wall 4 to which is secured by way of a spacer 5 and with a rivet 7 a leaf spring 6 in the form of an open annular member. The ends 8 and 9 of the leaf spring 6 are bent outwardly and define the aperture, which increases toward the center and outwardly of the rotatable disk for the radial insertion and withdrawal of the buttons. The annular wall 4 serves as an abutment which limits the movement of the leaf spring 6.

The mechanism is disposed in a housing 12 (Fig. 1) having side walls 10 and 11. Bores 13, only one of which is visible, serve to receive a pivot member 14, bores 16 provided with bearing sleeves 15 serve to receive a drive shaft 17, bores 18 a pivot shaft 19, bores 20 an operating shaft 21 and bores 22 a shaft 23.

A frame 25 carrying the button clamp 24 is pivotally mounted upon stud 14 and extends forwardly below the connecting bolt 26 to an extent that the button clamp 24 extends beyond the forward edge of the housing 12. The housing 12 is secured to the button sewer in such a manner that below the front edge 27 there is sufficient free space as corresponds to the height of the stroke of the button clamp 24. The lower ends of the jaws 28 and 29 of the button clamp 24 thus are in raised position and approximately at the height of the front edge of the housing 12.

The lifting of the button clamp 24 is effected in the usual manner by the button sewer machine. For this purpose a connection is provided (not illustrated) between the frame 25 and the presser bar of the sewing machine. The jaws 28, 29 are mounted for pivotal movement upon the frame 25 by means of bolts 30 and 34, respectively, while the lower ends are spring biased towards one another by means of a double armed spring 32. A connecting member 35 pivotally connected by means of bolts 33 and 31 with the jaws 28, 29 effects an equal movement of one of the jaws 28, 29 when the other is moved. The jaws 28 and 29 can only move with respect to one another until the connecting member 35 abuts at the right side by means of a set screw 36 against an adjustable abutment. The jaws 28, 29 are drawn somewhat forwardly in a manner that the needle can unimpededly reach a button from the top held in the slots 37.

The base 38 of the housing 12 has a plurality of raised portions 39 upon which the disk 40 is secured by means of screws (not shown) upon which rest strips 41, 42 and upon these in turn rest strips 43 and 44 in such a manner that the apertures 45, 46, 47 and 48 of the individual strips and of the raised portions 39 are in registering position. Furthermore, a protruding portion 49 is mounted upon the base 38 which has a bore 50 serving to pivotally receive the stud 2 of the rotatable disk 1. The latter is disposed at the level of the disk 40 within the circular cut-out 51 while the leaf spring 6 and the annular wall 4 are at the level of the strips 41 and 42, whereas the strips 43 and 44 laterally extend somewhat over the rotatable disk 1. A small intermediate space is provided between the disk 40 on the one hand and the base 38 on the other hand, in which space the bent forward end 52 of the operating lever 53 is accommodated. This carries a pin 54 which engages the slot 3 in the rotatable disk 1 from the bottom. The operating lever 53 is linked at its center portion by way of a link 55 to a pivot 56 mounted upon the base of the housing 12. At its rear end the lever 53 is guided along a straight line by means of a guide member 59 which engages a slot 57 of a slide disk 58. Longitudinal movement of this guide member 59 causes the pin 54 to perform an arcuate movement around protruding portion 49 so that the bent end 52 of the operating lever 53 reaches in the forward position around the protruding portion 49 causing the rotatable disk 1 to assume a position which is displaced by 180° with respect to the position shown in Fig. 5.

A drive shaft 17 supports intermediate the bearing sleeves 15 a set of cam disks 60, 61, 62, 63 and externally of the side wall 10 of the housing 12 a coupling disk 64. A bore 65 in the coupling disk pivotally supports a blade 66 which is biased in counterclockwise direction by a spring 67. A turned up lug 68 of the blade 66 thus engages the outer periphery of the coupling disk 64 thus limiting the range of operation. In front of the coupling disk 64 a driving disk 69 rotates continuously in the direction indicated by the arrow and supports along the side facing the coupling disk 64 a plurality of coupling pins 70. These are arranged in such a manner that they contact the nose of the blade 71 when it is shifted to the left but pass over it when it is shifted to the right.

The operating shaft 21 carries a double armed lever 72 outside the side wall 10, one arm 73 of which is disposed between a spring 74 and an abutment 75, and is pressed against the same in clockwise direction. Under these conditions the angular end 76 of arm 73 is disposed at the same distance from the drive shaft 17 as the lug 68 of the blade 66. Pressure upon the arm 77 of lever 72 permits the angular end 76 of the arm 73 to be shifted out of the path of rotation of lug 68 against the pressure of spring 74.

The nose 71 of the blade which is shifted into the path of rotation of the coupling pins 70 by means of spring 67 is engaged by one of the pins and carried along in a manner that the coupling disk 64 and the drive shaft 17 also rotate. Upon completion of one rotation the lug 68 abuts against the angular end 76 of the lever arm 73 which has returned to its original position in a manner that the blade 66 is displaced clockwise against the pressure of spring 67. In this manner the nose of the blade 71 is disengaged from the particular coupling pin 70 which is in engagement therewith and from the coupling disk 64, and as a result also the drive shaft 17 stands still while the drive disk 69 continues to rotate. The brief shifting of the double armed lever 72 in counterclockwise direction causes the turned up end 76 to release its engagement with the lug 68 and the drive shaft 17 makes a rotation, whereupon it automatically comes to a standstill.

Follower levers 78, 79, 80 and 81 are rotatably mounted at their hubs 82, 83, 84, 85 upon the pivot shaft 19. These follower levers 78 to 81 carry the follower rollers 86, 87, 88, 89 and at their lower ends engage the member of the mechanism which they are intended to guide. The follower lever 78 is provided with an arcuate recess 90 at its lower end which is engaged by the guide member 59 of operating or rotating lever 53 in a manner to constitute a connection simulating a ball joint. A button pusher bar 91, a bar 92, and a guide bar 93 are linked to the follower levers 79, 80, 81. These bars are disposed below the frame 25 which encloses the follower levers 78 to 81 and which supports the button clamp 24.

The forward end of the button pusher bar 91 constitutes the button pusher 94 and rests in the slot between the blades 41 and 42 upon the disk 40. The bar 92 carries a feeler 95 provided with pins 96 arranged in a manner corresponding to the distances of the holes in the buttons. A lateral extension 98 of the horizontal arm of an angular lever 97 reaches under the bar 92, which angular lever is rotatably mounted upon a bearing bolt 100 threadedly supported in a threaded bore 99 of the side wall 11 and is linked by way of its vertical arm to the guide bar 93. Longitudinal displacement of the latter consequently effects vertical movements of the bar 92 and thus of the feeler 95.

A roller 101 mounted at one end of the lever 102 which is journalled on shaft 23 rests upon the upper edge of the bar 92. A roller 103 secured to one end of a lever 104 which is connected to a further lever 105 and is likewise pivotally mounted upon shaft 23 rests upon the upper edge of button pusher bar 91. Longitudinal movements of the button pusher bar 91 cause roller 103 to roll on a cam 106 thus being raised and lowered in a manner that also the end of lever 105 executes vertical movements.

Springs 107, 108, 109, 110 are hooked at their upper ends onto pins 111, 112, 113 114 of the follower levers 78 to 81. The lower end of spring 110 is hooked to the shaft 23, that of spring 109 to a lug 115 of lever 102, and the springs 107 and 108 each to a lug of levers 105 or 104 (not shown in the drawing) similar to lug 115. The springs 107 to 110 on the one hand effect that the follower rollers 86 to 89 rest against the cam disks 60 to 63, and on the other hand that the rollers 101 and 103 cause bar 92 and button pusher bar 91 to be pressed downwardly. This furthermore insures the engagement of the bar 92 with the projecting member 98, as well as the guiding of lever 105 by means of cam 106.

A cut-out 116 is provided in the side wall 10 of housing 12 adjacent to which the frame 25 carrying the button clamp 24 is provided with a bent portion 117. The recess 116 and bent portion 117 provide a free space approximately above the location where the button guide member 118 of the blade 43 is located. To this is connected the lower end of a button supply container 119 which is in the form of a guide rail to which the button releasing means 120 is connected. These means comprise a shaft 122 received in a bearing block 121, which shaft carries at one end the lever arms 123, 124 and at its other end an operating lever 125. A spring, which is not visible, tends to rotate the shaft 122 in clockwise direction. This rotational movement is limited in that the end of lever 123 abuts the rear wall 126 of the button container 119. The distance of the ends of the lever arms 123 and 124 is approximately that of a button diameter. The bent up end 127 of the operating lever 125 is disposed directly over the end of lever 105 in a manner that an upward movement of the latter causes the operating lever 125 to be rotated counterclockwise, which in turn removes the end of lever arm 123 from the rear or upper wall 126 of the button supply container 119 while the end of lever arm 124 again comes to rest against the wall. The last button of a row of buttons held in the button container 119 by lever arm 123 slides in this manner between lever arms 123 and 124. Due to the downward movement of lever 105 and thus of the operating lever 125 the lever arm 123 again comes to rest against the wall 126 and in this manner holds the row of buttons disposed above it. The lever arm 124 on the other hand frees the button which has followed so that it falls out of the button container 119 and is guided by the button guide blade 118 onto disk 40 between the blades 41 and 42 which are somewhat recessed at this location. The operation of the button release described above takes place during the rearward movement of the button pusher bar 91 at that momement at which the button pusher 94 of the same has already freed the location on the disk 40 to be occupied by the button. In the rearward end position the button pusher 94 is disposed between the edges 128 and 129 of the blades 41 and 42.

The mechanism described operates as follows: In Fig. 2 the form of the cam disks 60-63 is schematically illustrated, and the operating effect thereof will best be understood by referring to this illustration. When the cam disks 60-63 which are coupled to the continuously rotating driving disk 69 make one revolution in counterclockwise direction, the follower rollers 86-89 roll on them in clockwise direction and thereby moves the components which are linked to the lower end of the follower levers 78-81. Thus Fig. 2 is a time as well as a path diagram in polar coordinates for the movements of the feeler 95, of the button pusher bar 91 and of the rotatable disk. The angular positions taken in clockwise direction represent the time as an independent variable, while the radius of the individual cams indicates the instantaneous values of the position of the said parts 1, 91 and 95 in such a manner that small radii indicate a turned back, withdrawn or lowered position, while large radii indicate the advanced or raised position.

The starting point is chosen to be the position illustrated in Fig. 8 where the components are at rest with the driving means disconnected. This is indicated in Fig. 2 by the straight line A. The cam disk 60 here presents the smallest radius, and accordingly the opening between the ends 8 and 9 of the leaf spring 6 which is disposed upon the rotatable disk 1 is turned away from the button clamp 24 which is supported proximate the end of housing 12. The button pusher bar 91 is drawn back nearly half way in accordance with cam disk 61. The feeler 95 is almost completely withdrawn somewhat ahead of the center of the rotatable disk 1 in raised position as determined by cam disk 62 for the forward and backward movement, and by cam disk 63 for raising and lowering. As the drive shaft 17 rotates the individual components effect the following movements:

At B the feeler 95 is moved back completely by action of cam 62 so that the pins 96 are approximately above the center of rotatable disk 1, and it is lowered by the action of cam 63 upon the button which is clamped in the leaf spring 6. This position is illustrated in Fig. 9. By virtue of cam 60 the rotatable disk 1 gradually begins its rotation to move the slot 3 to the front. The button pusher bar 91 is moved backward by means of cam 61. A button from the button container 119 is caused to be released by the cam 106 and levers 104 and 105 and drops upon the disk 40 rearwardly of disk 1. During the following forward rotation of rotatable disk 1 the feeler 95 rests upon the other button which is already being held by the leaf spring 6, which button is caused to rotate until the pins 96 drop into its holes, whereupon the rotatable disk executes the remaining forward rotation. The leaf spring 6 in this connection slides along the periphery of the button.

In the position C which is illustrated in Fig. 10 the forward rotation of the rotatable disk is ended as determined by cam 60. The aperture disposed between the ends 8 and 9 of the leaf spring 6 faces the button clamp 24, the slots 37 (Fig. 1) of which are at the height of the button which is disposed upon the rotatable disk 1 and which connect with the forward edge 27 of the housing 12. The cam 62 starts to effect the forward movement of the feeler 95. A button pusher projection 130 provided beyond the feeler now first ejects the button in the button clamp 24 which has been previously sewed on.

At D the button has been pushed forward by means of the pins 96 and by action of cam 62 that by virtue of cam 60 the return rotation of the rotatable disk can begin.

At E the feeler 95 has arrived in its forwardmost position as determined by cam 62 and as illustrated in Fig. 11, and placed the button in its correct position into the slots 37 of the button clamp 24. A slot 131 in feeler 95 (see Fig. 1) provides a space to accommodate the needle which, when the machine has been switched off, has remained stationary in a predetermined position. The feeler 95 now is raised by means of cam 63 in a manner that the pins 96 leave the holes of the button.

At F the feeler 95 has been completely raised by cam 63 while cam 62 causes the return movement of the feeler in raised position.

At G the return movement of rotatable disk 1 by means of cam 60 has been terminated, while the end 94 of the button pusher bar 91 which serves as button pusher pushes the button, which in accordance with cam 61 has dropped at B upon the disk 40 in front of it between the ends 8, 9 and into the leaf spring 6.

At H the insertion of the button into the leaf spring 6 is terminated as shown in Fig. 12, while the feeler 95 due to the operation of cams 62 and 63 remains in raised position somewhat forward of the center of the rotatable disk 1. Then at A the entire mechanism again comes to rest as seen in Fig. 8.

Thus, during one rotation of the drive shaft 17, the insertion of a button from the leaf spring 6 into the button clamp 24 and the advancing of a new button from the button container 119 into the leaf spring 6 is accomplished.

The different operating positions are also illustrated schematically in Figs. 8 to 12 where the relative positions of the feeler supporting bar 92, the button pusher 94 and of the rotatable disk 1 are illustrated somewhat schematically in connection with the operating or driving levers and mechanism therefor. Each gang of driving members is illustrated by different lines. Thus, the drive means for disk 1 is shown in solid lines, the drive means for the button pusher 94 in dot and dash lines, the drive for the feeler 92 in dashed lines, while the vertical drive for the feeler is shown in short dashes.

From these figures it will be seen how the rotatable disk 1 and feeler 92 cooperate in order to move the button into aligned position. Fig. 9 shows the button in the disk 1 below the feeler but with the holes in the button not yet in alignment with the pins of the feeler. In Fig. 10 the button has been moved on the disk 1 to the position where the pins of the feeler have entered the holes of the button so that the button is now in alignment. Fig. 11 illustrates how the button is discharged from the disk 1 and transported forwardly, and Fig. 12 illustrates the feeler in retracted and raised position ready to start a new cycle of operations.

As shown in Fig. 5 the mechanism is mounted upon the guide plate 133 of a button sewer machine by means of a pin 132, which machine comprises the material carrier arm 134, a needle bar 135 and a needle 136.

Having now described our invention and the manner of its operation with reference to an embodiment of the mechanism illustrated in the drawings, we do not wish to be limited thereto, but what we desire to protect by Letters Patent of the United States is set forth in the appended claims.

We claim:

1. In a button sewer machine having a machine arm supporting a needle bar and a needle, a material supporting arm disposed below said machine arm, a mounting plate, a button supply container having a discharge end proximate and above said mounting plate and a button feeding device operatively associated with said container, a button clamp disposed on said supporting arm at one end of said mounting plate and below said needle bar in operative alignment with said needle, mechanism adapted to slide buttons with their holes in aligned position into said button clamp, said mechanism including a disk pivot supporting a rotatable disk proximate said one end of said plate between said container and said clamp, resilient means presenting an aperture adapted to receive and release buttons in directions radially of said disk, means operative to rotate said disk from a position of said aperture in receiving relation to the discharge end of said container to a position of said aperture in button feeding alignment with said clamp and back to starting position, including a slot in said disk, and an operating bar having one end in engagement with said slot, a synchronously movable button pusher bar extending parallel to said operating bar having one end operative to move buttons discharged from said container onto said disk, a button feeler bar proximate said operating bar and said pusher bar having one end movable longitudinally and vertically relative to said disk over and into engagement with buttons on said disk and over said clamp, where the angle of rotation of said buttons on said disk below said feeler is equal to at least the angular distance between two adjacent holes in the buttons, and a drive shaft and cam means at the other ends of said bars operative to engage and move said bars in synchronism.

2. In a button sewer machine having a machine arm supporting a needle bar and a needle, a material supporting arm disposed below said machine arm, a mounting plate, a button supply container having a discharge end proximate and above said mounting plate and a button feeding device operatively associated with said container, a button clamp disposed on said supporting arm at one end of said mounting plate and below said needle bar in operative alignment with said needle, mechanism adapted to slide buttons with their holes in aligned position into said button clamp, said mechanism including a disk pivot supporting a rotatable disk proximate said one end of said plate between said container and said clamp, resilient means presenting an aperture adapted to receive and release buttons in directions radially of said disk, means operative to rotate said disk from a position of said aperture in receiving relation to the discharge end of said container to a position of said aperture in button feeding alignment with said clamp and back to starting position, including a slot in said disk, and an operating bar having one end in engagement with said slot, a synchronously movable button pusher bar extending parallel to said operating bar having one end operative to move buttons discharged from said container onto said disk, a button feeler bar proximate said operating bar and said pusher bar having one end movable longitudinally and vertically relative to said disk over and into engagement with buttons on said disk and over said clamp, where the angle of rotation of said buttons on said disk below said feeler is equal to at least the angular distance between two adjacent holes in the buttons, and a drive shaft and cam means at the other ends of said bars operative to engage and move said bars in synchronism, said resilient means presenting a pair of arcuately outwardly bent lateral jaws defining said aperture, and being defined by an arcuately shaped leaf spring having its central portion secured to said disk.

3. In a button sewer machine having a machine arm supporting a needle bar and a needle, a material supporting arm disposed below said machine arm, a mounting plate, a button supply container having a discharge end proximate and above said mounting plate and a button feeding device operatively associated with said container, a button clamp disposed on said supporting arm at one end of said mounting plate and below said needle bar in operative alignment with said needle, mechanism adapted to slide buttons with their holes in aligned position into said button clamp, said mechanism including a disk pivot supporting a rotatable disk proximate said one end of said plate between said container and said clamp, resilient means presenting an aperture adapted to receive and release buttons in directions radially of said disk, means operative to rotate said disk from a position of said aperture in receiving relation to the discharge end of said container to a position of said aperture in button feeding alignment with said clamp and back to starting position, including a slot in said disk, and an operating bar having one end in engagement with said slot, a synchronously movable button pusher bar extending parallel to said operating bar having one end operative to move buttons discharged from said container onto said disk, a button feeler bar proximate said operating bar and said pusher bar having one end movable longitudinally and vertically relative to said disk over and into engagement with buttons on said disk and over said clamp, where the angle of rotation of said buttons on said disk below said feeler is equal to at least the angular distance between two adjacent holes in the buttons, and a drive shaft and cam means at the other ends of said bars operative to engage and move said bars in synchronism, said resilient means presenting a pair of arcuately outwardly bent lateral jaws defining said aperture, and being defined by an arcuately shaped leaf spring having its central portion secured to said disk, and an arcuately shaped abutment member disposed around said leaf spring and secured to said disk.

4. In a button sewer machine having a machine arm supporting a needle bar and a needle, a material supporting arm disposed below said machine arm, a mounting plate, a button supply container having a discharge end proximate and above said mounting plate and a button feeding device operatively associated with said container, a button clamp disposed on said supporting arm at one end of said mounting plate and below said needle bar in operative alignment with said needle, mechanism adapted to slide buttons with their holes in aligned position into said button clamp, said mechanism including a disk pivot supporting a rotatable disk proximate said one end of said plate between said container and said clamp, resilient means presenting an aperture adapted to receive and release buttons in directions radially of said disk, means operative to rotate said disk from a position of said aperture in receiving relation to the discharge end of said container to a position of said aperture in button feeding alignment with said clamp and back to starting position, including a slot in said disk, and an operating bar having one end in engagement with said slot, a synchronously movable button pusher bar extending parallel to said operating bar having one end operative to move buttons discharged from said container onto said disk, a button feeler bar proximate said operating bar and said pusher bar having one end movable longitudinally and vertically relative to said disk over and into engagement with buttons on said disk and over said clamp, where the angle of rotation of said buttons on said disk below said feeler is equal to at least the angular distance between two adjacent holes in the buttons, and a drive shaft and cam means at the other ends of said bars operative to engage and move said bars in synchronism, and a rockable link mounted on a pivot member disposed in axial alignment with said disk pivot connected to said operating bar intermediate the ends thereof and said operating bar having at said one end a pin in sliding engagement with said slot and interengaging longitudinal guide means being disposed at the other end of said operating bar proximate said cam means adapted to impart reciprocating movements thereto.

5. A mechanism in accordance with claim 4 wherein said drive shaft and cam means include a plurality of guiding cams mounted upon said drive shaft, said drive shaft being rotatable and extending transversely of the end of said lever adjacent said interengaging means, a plurality of follower levers mounted upon a supporting shaft extending parallel to said drive shaft each in spring biased engagement with one of said cams and wherein said interengaging guide means include a joint connecting said operating bar to one said follower lever, and said button pusher bar and said feeler bar being longitudinal bars having their other ends connected to second and third follower levers.

6. A device in accordance with claim 5 including a cam conformation defined lengthwise of said button pusher bar adapted to cooperate with said button feeding device to release a button from said container to be fed to said disk.

7. A device in accordance with claim 6 including a lifting lever bar pivotally connected at one end to a fourth of said follower levers and an angular lever in operative engagement with the other end of said lifting lever bar, a lateral extension on said angular lever in engagement with the lower side of said feeler bar, said feeler bar being movable longitudinally by said third follower lever and being movable vertically by rocking movements of said angular lever in response to movements of said fourth follower lever.

References Cited in the file of this patent

UNITED STATES PATENTS

| | | |
|---|---|---|
| 761,285 | Chilton | May 31, 1904 |
| 1,230,860 | Carley | June 26, 1917 |
| 1,599,146 | Ross | Sept. 7, 1926 |
| 1,940,229 | Rawnsley | Dec. 19, 1933 |
| 1,941,027 | Vaughan | Dec. 26, 1933 |
| 2,321,990 | Burkey | June 15, 1943 |
| 2,661,709 | Troll | Dec. 8, 1953 |